Sept. 1, 1964  H. HOFFMANN  3,146,683
COMPOSITE LUBRICATING SEAL
Filed Sept. 10, 1962

HELMUT HOFFMANN
INVENTOR.

BY
Mestern, Ross & Mestern

3,146,683
COMPOSITE LUBRICATING SEAL
Helmut Hoffmann, Bad Homburg vor der Hohe, Germany, assignor to Alfred Teves K.G., Frankfurt am main, Germany, a corporation of Germany
Filed Sept. 10, 1962, Ser. No. 222,583
Claims priority, application Germany Sept. 19, 1961
13 Claims. (Cl. 92—155)

My present invention relates to devices for smoothing rough surfaces and, more particularly, to arrangements for smoothing at least one of two substantially contacting relatively displaceable juxtaposed surfaces.

It is well known that relatively displaceable contacting surfaces often encounter considerable friction as a result of roughness of both or one of the surfaces. This is particularly the case in piston-and-cylinder arrangements wherein the cylinder has a rough inner wall and in machine tools having cross-slides and the like adapted to slide along relatively rough ways. Attempts to reduce the friction forces retarding such displacement and the abrasive character of the rough surfaces, which tend gradually to erode the bearing faces of the relatively moving bodies, having generally consisted in applying a lubricant such as grease or oil to these surfaces. Such attempts have not been completely satisfactory, however, since disappearance of the oil or grease film again results in abrasive erosion of the bearing faces. It was thus necessary to machine (e.g. by grinding) these bearing faces so that a simple lubrication suffices to prevent wear and the development of frictional heat. Such machining is, in many cases, of prohibitive cost and attempts to avoid complete finishing have resulted in semirough surfaces with resultant wear.

It is an object of the present invention to provide a device for smoothing rough surfaces of the character described. Another object of the invention is to provide an improved piston-and-cylinder arrangement wherein surface irregularities can be obviated.

According to the principal feature of the present invention a body, displaceable along a relatively rough surface substantially in contact therewith, is formed with a recess opening toward this surface and containing a plastically deformable mass of a filling and lubricating agent adapted to fill cavities in the surface. Means are provided on the body for compressing this mass toward the surface thereby urging the filling agent into the cavities constituting the surface irregularites therein. The filling agent advantageously is a comminuted substance such as molybdenum disulfide which tends to adhere readily to metallic surfaces and fill cavities therein. Molybdenum disulfide is not easily removed from irregular surfaces by flushing with fluids such as oil, air or water and tenaciously adheres to the surface in spite of mechanical dislodging efforts. The molybdenum disulfide is preferably bonded in the aforementioned mass with the aid of a relatively soft synthetic-resin binder such as polyethylene.

According to a more particular feature of the invention a piston, reciprocable within a rough-walled cylinder, is provided with the aforementioned means for smoothing or leveling the irregularities in this surface. To this end the piston advantageously is formed with an outwardly open circumferential recess adapted to receive the plastically deformable mass of molybdenum disulfide and binding agent while bearing on this mass to compress it against a shoulder of the piston, thereby urging the mass outwardly against the irregular wall of the cylinder. It will be apparent that the molybdenum disulfide serves not only to fill the cavities in this wall but also as a substantially permanent lubricant disposed between the contacting surfaces of the piston and the cylinder and results in a polished cylinder wall. Severe surface irregularities are thus smoothed so that shredding of the piston rings or sealing means, which generally are of rubber or a synthetic resin, does not occur. In this connection it should be noted that, especially in cylinders constituted from drawn or seamless tube or pipe stock and which are not usually finished interiorly, rapid deterioration of the piston-sealing means often occurs.

Since there is frequently a clearance between the juxtaposed guide surfaces of the piston and cylinder into which the plastically deformable mass containing molybdenum disulfide may enter, I prefer to provide means for preventing the entry of the plastically deformable mass into this clearance. Such means may include a ring of a material having a high wear resistance and a low friction coefficient carried on the piston and engaging the wall of the cylinder in juxtaposition with the pressure means. Thus, a support ring of polytetrafluoroethylene may be provided forwardly of this mass in the direction of axial displacement of the compressing means in engagement with the cylinder wall. The polytetrafluoroethylene ring may be disposed against the piston shoulder so that it facilitates the flow of the filling-agent mass along this shoulder toward the cylinder wall while preventing entry of the filling agent between piston and cylinder.

The pressure means for urging the filling agent radially outwardly into engagement with the wall of the cylinder may include spring means for applying axial forces to this mass which result in a radial displacement thereof owing to its plastic deformability and fluent condition. It is also possible to provide radially effective spring means or, preferably to make use of fluid pressure within the cylinder to force the filling agent into contact with the cylinder wall. To this end the piston may be provided with sealing means, e.g. O-rings or flanged seals which are exposed to fluid pressure in the high-pressure cylinder chamber and which are urged by the fluid pressure in the direction of the filling-agent mass. Again, this mass is compressed radially outwardly into engagement with the wall.

The above and other objects, features and advantages of the present invention will become more readily apparent from the following description, reference being made to the accompanying drawing in which.

Figure 1:
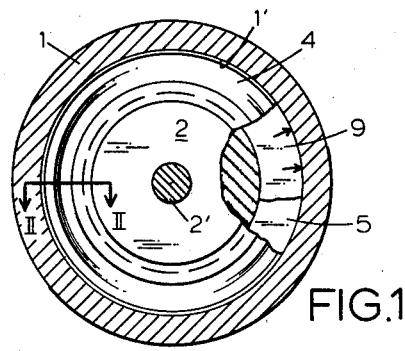
FIG. 1 is a transverse cross-sectional view of a piston-and-cylinder arrangement according to the invention.
Figure 2:
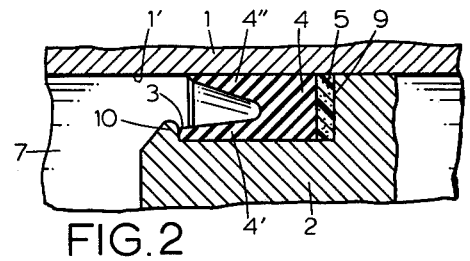
FIG. 2 is an enlarged cross-sectional view taken along line II—II of FIG. 1.

In FIGS. 1 and 2 I show a drawn-steel hydraulic cylinder 1 in which a piston 2 is reciprocable to entrain its rod 2'. The piston 2 is provided with a circumferential recess 3 in which is disposed a plastically deformable ring 5 of molybdenum disulfide with a polyethylene binder, the molybdenum disulfide constituting about 80% by weight of the deformable mass. The filling agent of ring 5 is urged radially outwardly into engagement with the rough inner wall 1' of the cylinder 1 which may have surface irregularities on the order of up to 3–10 microns. Axial pressure is applied to the deformable ring by a flanged seal 4 whose lips 4', 4" are urged radially by the pressure of the fluid within the high-pressure chamber 7 of the cylinder 1 against the piston and the cylinder wall, respectively. Simultaneously, this sealing member is forced axially against ring 5 which is compressed toward the abutment shoulder 9 of the piston 2. The filling-agent mass thus flows outwardly and fills concavities within surface 1' as it is distributed therealong upon reciprocation of the piston. An annular retaining projection 10 on the piston 2 prevents the flanged seal 4 from slipping out of the recess 3.

Figure 3:
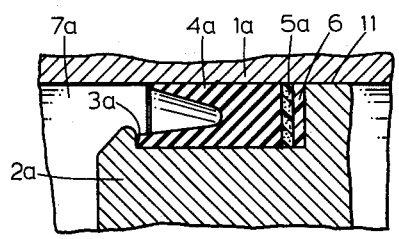
FIGS. 3 and 4 are views similar to FIG. 2 showing further embodiments of the invention.

In FIG. 3 there is shown a generally similar arrangement wherein, however, the piston 2a has its recess 3a somewhat enlarged so as to receive a ring 6 of polytetrafluorethylene which serves to prevent entry of the filling-agent mass 5a into any gap which may be formed at 11 between the piston 2a and the cylinder 1a. Again, fluid pressure within a high-pressure chamber 7a forces a sealing member 4a axially to compress the sealing agent against the cylinder wall.

Figure 4:
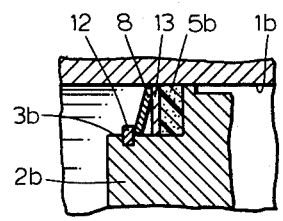

In FIG. 4 I show an arrangement wherein a dished spring 8 bears upon an annular pressure-transmitting plate 13 to compress the mass 5b of filling agent within the recess 3b of piston 2b. A retaining ring 12 secures spring 8 so that its force urges the filling agent into engagement with the inner wall of cylinder 1b. In this case the filling agent is urged against the wall regardless of whether or not a pressure is maintained within the cylinder. It should be noted that expansion or ring springs may also be employed in addition to the axially effective dished spring shown in FIG. 4.

Figure 5:
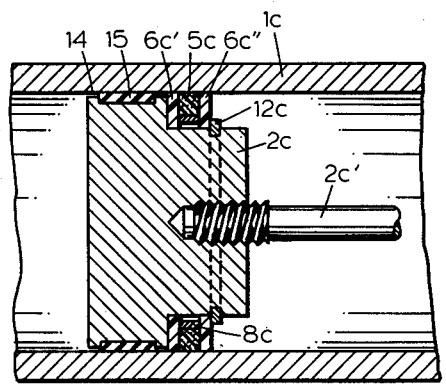
FIG. 5 is an axial cross-sectional view of another piston-and-cylinder arrangement.

In FIG. 5 I illustrate a radially effective spring 8c which urges the plastically deformable mass 5c of molybdenum disulfide outwardly into contact with the wall of cylinder 1c. This mass is retained between rings 6c' and 6c'' of polytetrafluorethylene which bear against the inner surface of the cylinder and facilitate the deposition of the filling agent on the wall. These rings, however, prevent entry of the molybdenum disulfide into the clearance 14 between the piston and the wall. This clearance may be filled, if desired, by conventional sealing means indicated at 15. A retaining ring 12c serves to secure the polytetrafluorethylene rings in place upon the piston 2c which is reciprocated by a rod 2c'.

Figures 6, 7:
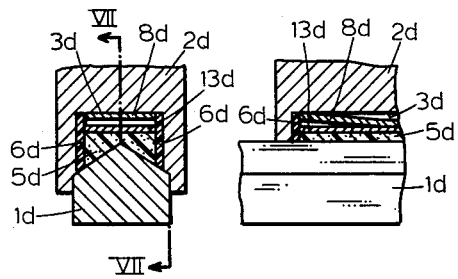
FIG. 6 is a transverse cross-sectional view through the bed of a machine tool embodying the invention.
FIG. 7 is a cross-sectional view taken along line VII—VII of FIG. 6.

FIGS. 6 and 7 show the cross-slide 2d of a machine tool which is displaceable upon the V-way 1d of a bed not shown. The cross-slide 2d is provided with a recess 3d which is lined with polytetrafluorethylene at 6d and receives a mass 5d of molybdenum disulfide filling agent. This plastically deformable mass is urged into engagement with the rough surface of the V-way by a leaf spring 8d which bears upon a pressure-transmitting plate 13d.

Figure 8:
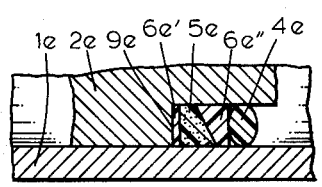
FIG. 8 is a view similar to FIG. 2 of still another smoothing means.

In the embodiment of FIG. 8 an O-ring 4e is urged by fluid pressure against a wedge-shaped polytetrafluorethylene ring 6e'' which forces the mass 5e of molybdenum disulfide and polyethylene binder against the wall of the cylinder 1e. The shoulder 9e of the piston 2e is again lined with a polytetrafluorethylene ring 6e' which supports the mass 5e and prevents it from entering any gap between the piston and cylinder wall. The sealing members of the piston-and-cylinder arrangement described above have virtually an unlimited life in contrast with those of systems wherein no smoothing has been effected. These systems fail after only a few thousand strokes.

I claim:

1. A lubricating system for a rough surface, comprising a body displaceable along said surface substantially in contact therewith and formed with a recess opening toward said surface; a plastically deformable mass of a filling agent adapted to fill cavities in said surface disposed in said recess; means on said body for compressing said mass toward said surface, thereby urging said agent into said cavities, and antifriction means extending transversely to said surface substantially in contact therewith and lining at least one wall of said recess in contact with said mass.

2. A device according to claim 1 wherein said agent is comminuted molybdenum disulfide, said mass further comprising a synthetic-resin binder for said molybdenum disulfide.

3. A device according to claim 2 wherein said binder is polyethylene.

4. In a piston-and-cylinder arrangement, in combination, a cylinder having an irregular inner surface; a piston reciprocable within said cylinder and formed with a circumferential recess opening toward said surface; a plastically deformable mass of a filling agent adapted to fill cavities in said irregular surface disposed in said recess; and pressure means on said piston for compressing said mass radially outwardly in the direction of said surface, thereby urging said agent into said cavities, said pressure means including an annular shoulder on said piston extending generally transversely to the axis of said cylinder, and a member axially shiftable on said piston for compressing said mass against said shoulder, thereby forcing said mass in radial direction.

5. The combination according to claim 4 wherein said member is a ring bearing upon said mass, said pressure means further comprising axially effective spring means urging said ring in axial direction.

6. The combination according to claim 5 wherein said spring means is an annular dish spring.

7. In a piston-and-cylinder arrangement, in combination, a cylinder having an irregular inner surface; a piston reciprocable within said cylinder and formed with a circumferential recess opening toward said surface; a plastically deformable mass of a filling agent adapted to fill cavities in said irregular surface disposed in said recess; and pressure means on said piston for compressing said mass radially outwardly in the direction of said surface, thereby urging said agent into said cavities, said pressure means including an annular shoulder on said piston extending generally transversely to the axis of said cylinder, a member axially shiftable on said piston for compressing said mass against said shoulder, thereby forcing said mass in radial direction, and a ring of a material having a low coefficient of friction interposed between said mass and said shoulder in engagement with said surface and in contact with said mass.

8. The combination according to claim 7 wherein said material is a polytetrafluorethylene.

9. The combination according to claim 7 wherein said cylinder and said piston form a chamber for fluid under pressure, said pressure means including a sealing member bearing upon said cylinder and said piston while being interposed between said chamber and said mass for compressing the latter under pressure from fluid within said chamber.

10. The combination according to claim 9 wherein said sealing member is a ring having a pair of annular flanges urged radially respectively against said piston and said cylinder by said fluid.

11. The combination according to claim 9 wherein said sealing member is an O-ring.

12. In a piston-and-cylinder arrangement, in combination, a cylinder having an irregular inner surface; a piston reciprocable within said cylinder and formed with a circumferential recess opening toward said surface; a plastically deformable mass consisting predominantly of molybdenum disulfide and a polyethylene binder therefor, adapted to fill cavities in said irregular surface, disposed in said recess; and axially displaceable pressure means on said piston forming a wall of said recess for compressing said mass radially outwardly in the direction of said surface, thereby urging said agent into said cavities.

13. In a piston-and-cylinder arrangement, in combination, a cylinder having an irregular inner surface; a piston reciprocable within said cylinder and formed with a guide face juxtaposed with said surface and a circumferential recess adjacent said face opening toward said surface; a plastically deformable mass consisting predominantly of molybdenum disulfide and a polyethylene binder therefor adapted to fill cavities in said irregular surface disposed in said recess; axially displaceable pressure means on said piston for compressing said mass radially outwardly in the direction of said surface, thereby urging said agent into said cavities; and a support ring of polytetrafluorethylene extending transversely to said surface and forming a wall of said recess intermediate said mass and said guide face for preventing extrusion of said mass between said surface and said face and effecting flow of said mass toward said surface.

References Cited in the file of this patent

UNITED STATES PATENTS

| | | |
|---|---|---|
| 2,493,602 | Sterrett | Jan. 3, 1950 |
| 2,728,620 | Krueger | Dec. 27, 1955 |
| 2,832,223 | Couraud | Apr. 9, 1958 |
| 2,866,223 | Van Dillen | Dec. 30, 1958 |
| 2,884,292 | Doner | Apr. 28, 1959 |
| 2,951,721 | Asp | Sept. 6, 1960 |
| 2,984,963 | Reuter | May 23, 1961 |
| 2,991,003 | Petersen | July 4, 1961 |
| 3,069,174 | Skinner | Dec. 18, 1962 |
| 3,071,386 | Scannell | Jan. 1, 1963 |

FOREIGN PATENTS

| | | |
|---|---|---|
| 555,519 | Great Britain | Aug. 26, 1943 |

OTHER REFERENCES

Product Engineering, Sept. 5, 1960, pp. 48–53.
Automotive Industries, April 1, 1962, pp. 41–44.